Patented May 5, 1931

1,803,582

UNITED STATES PATENT OFFICE

PIERRE ZUCCO, OF SAN FRANCISCO, CALIFORNIA

CEMENT COMPOSITION

No Drawing.    Application filed October 6, 1925.    Serial No. 60,906.

This invention relates particularly to a composition the ingredients and proportions of which will improve the physical and hydraulic properties of melted cement, and aluminous cement in particular.

An object of the invention is to provide a composition consisting of the proper proportions of granulated ferrous materials or other equivalent materials that are high in bicalcic silicate, which are added to ordinary melted cement or aluminous cement to improve the hydraulic and physical properties thereof.

A further object of the invention relates to a cement composition consisting of pentacalcic aluminate ($3Al_2O_3 5CaO$), to which may be added orthosilicate or bicalcic silicate. Other subjects and advantages will appear as this description progresses.

In this specification the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

The principle on which is based the present invention is as follows: It is known that bicalcic silicate or slag constituting the refuse from the manufacture of cast iron and, in spite of the fact that it is not inert with respect to the action of water, still starts to set and hardens in an appreciable way only after some length of time. But it is also known that the action of said compound is appreciably influenced by the action of tricalcic aluminate in watery solution in which it is soluble enough.

Melted cement consists of about 60% of its amount of calcium aluminate which after the process of hydration, acts as an excellent electrolite so as to reach the desired aim; namely to make the tricalcic silicate react under water. The granulated basic slags, constituting the refuse in the manufacture of cast iron from hematite with the blast furnace process, or similar refuse coming from the electro-thermic manufacture of spiegel, are an excellent ingredient for said compound.

Our recent research and study have in effect demonstrated that said refuse contains in very great quantities a basic silicate, which is exactly the bicalcic silicate $2CaO.SiO_2$ which in the process of granulation passes from a form practically inert under the action of water, to the form which is active. Our experience has demonstrated that by adding about thirty percent of said refuse or slag, finely ground, to the melted cement or to cement rich in alumina we can get a product the resistance of which practically does not diminish and which does not show any set back, the latter representing the most important fault of said cements. The formation of said silicate cannot be effectuated in very large quantities in the fabrication itself of melted cement by increasing the percent of silica because, at a very high temperature, like that of electric ovens, there is formed silica aluminate of calcium which is practically inactive.

The present invention consists of a composition of matter that is gained by utilizing the granulated refuse or slag resulting from the fabrication of cast iron from hematite in a blast furnace process, or the granulated refuse resulting from electro-thermic fabrication of spiegel. The granulated slag, or refuse, contains a high proportion of bicalcic silicate. The above substance is not inert with respect to the action of water, for after a considerable length of time it will commence to set and harden. The setting action of the above materials is appreciably hastened by the adding of tricalcic aluminate, in watery solution in which the first mentioned compound containing bicalcic silicate is found to be soluble.

I have discovered that the granulated slag or refuse resulting in the manufacture of cast iron from hematite with the blast furnace process, or similar refuse coming from the electro-thermic manufacture of spiegel, contains very great quantities of the basic silicate that is such a valuable part of my composition. This basic silicate is chemically termed orthosilicate, or bicalcic silicate, (2CaO.SiO$_2$) and in the process of granulation passes from a practically inert form to an active form.

I have discovered that by adding about 30% by volume of the refuse or slag, in a granulated condition, to cement or to cement rich in alumina and milling the same, I obtain a composition of practically constant resistance and of uniform strength, from the time that it has first set until it has finally hardened in contrast with ordinary cement, which proves to be stronger within a short time after its initial set than it is after it has finally hardened.

The refuse that is available as the principal ingredient of my composition, is at the present time used for no valuable purpose, and I can obtain it for a very nominal cost. The volume of this material when added to melted cement, or to aluminous cement, improves the hydraulic and physical qualities thereof far above normal, due to the fact that the volume of said material is large in proportion to the cement, while the cost of production and of sale of the product is reduced.

Although my granulated refuse material when added to ordinary melted cement will increase the efficiency above normal, I have also discovered that by adding the said material to a special kind of melted cement, even better results are obtainable. This cement consists of pentacalcic aluminate, which is obtained by combining five parts of calcium oxide (CaO) with three parts of aluminum oxide, (Al$_2$O$_3$) to arrive at a composition consisting of the following formula (3Al$_2$O$_3$5CaO). This product is produced in an electric oven, or any other type of oven, and I obtain a very high grade of melted cement, which, when combined with the bicalcic silicate produces an ideal cement composition.

By adding to melted cement some bicalcic silicate, said latter substance will in the presence of the aluminate in the melted cement hydrate more rapidly and will add to the resistance of the cement when hardened and improve the property of the melted cement. The granulated refuse contains, in surplus of the basic silicate, some silica in the form of hydrated colloidal which comes from the granulation of the refuse and is of such a nature as to readily combine with lime, like the silica of pozzolana and of free alumina. The granulated refuse acts better in a basic surrounding that is rich with lime. My melted cement contains alumina in the form of monocalcic aluminate, which during hydration is transformed into tricalcic aluminate and gelatinous alumina. If the amount of lime is increased to reach the composition of the penta-aluminate of calcium, this, hydrolyzing produces, besides the tricalcic aluminate and alumina, some lime which either remains in solution or is in part deposited in crystal forms. This lime together with the lime obtained from the hydrolyzing of the bicalcic silicate, furnishes a first class basic surrounding to react with the principal element of the refuse.

Putting together granulated basic refuse and melted cement I produce: rapid hydration of the bicalcic silicate contained in the refuse; a stop in the lowering of the strength of the melted cement; a progression in the resistance of the melted cements; and a very appreciable decrease in the price of production, because said refuse can be obtained at a very low price and even free in certain cases.

Having thus described this invention, what I now claim and desire to secure by Letters Patent is:

1. A composition consisting of a mixture of aluminous cement and a slag containing bicalcic silicate.

2. A composition consisting of a mixture of the melted cement high in alumina and granulated basic slag containing bicalcic silicate.

3. A cement mixture formed of pentacalcic aluminate (3Al$_2$O$_3$5CaO) and bicalcic silicate (2CaO.SiO$_2$).

4. A composition consisting of melted aluminous cement and granulated bicalcic basic slag containing bicalcic silicate mixed and ground together.

5. A composition consisting of a mixture of aluminous cement, having a content of approximately sixty percent of calcium aluminate, and approximately thirty parts of bicalcic silicate.

6. The method of forming a cement composition which comprises granulating the basic slag, containing bicalcic silicate, from the fabrication of cast iron from hematite; and mixing the granulated slag with aluminous cement.

7. The method of forming a cement composition which comprises mixing the refuse obtained from the smelting of iron ore with cements high in alumina.

8. The method of forming a cement composition which comprises passing the refuse obtained in the fabrication of cast iron, into a water bath to granulate the same; and mixing the same with aluminous cement.

9. A composition comprising a mixture of approximately seventy parts by volume of aluminous cement, and approximately thirty parts of refuse containing a high percentage of bicalcic silicate.

In testimony whereof, I have hereunto set my hand at San Francisco, California, this 30th day of September, 1925.

PIERRE ZUCCO.